Sept. 16, 1930.  N. D. LEVIN  1,775,680

COUPLING DEVICE FOR SPROCKET CHAINS

Original Filed June 23, 1924

Patented Sept. 16, 1930

1,775,680

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

COUPLING DEVICE FOR SPROCKET CHAINS

Original application filed June 23, 1924, Serial No. 721,871. Divided and this application filed December 29, 1924. Serial No. 758,630.

The present invention relates to certain new and useful improvements in coupling devices for chains, and particularly is it designed for sprocket chains, such as are especially adapted to use in conveyors of the scraper type.

It is the especial object of this invention to provide a coupling device which shall be simple in construction and reliable in operation; which may be quickly and conveniently manipulated to connect or disconnect adjacent chain ends, and which will permit mounting a scraper flight thereon without interference with its coupling and uncoupling functions.

The means whereby I attain these objects are fully set forth in the following specification and illustrated in the accompanying drawings, of which—

Like numerals refer to similar parts in the several figures.

Figure 1:
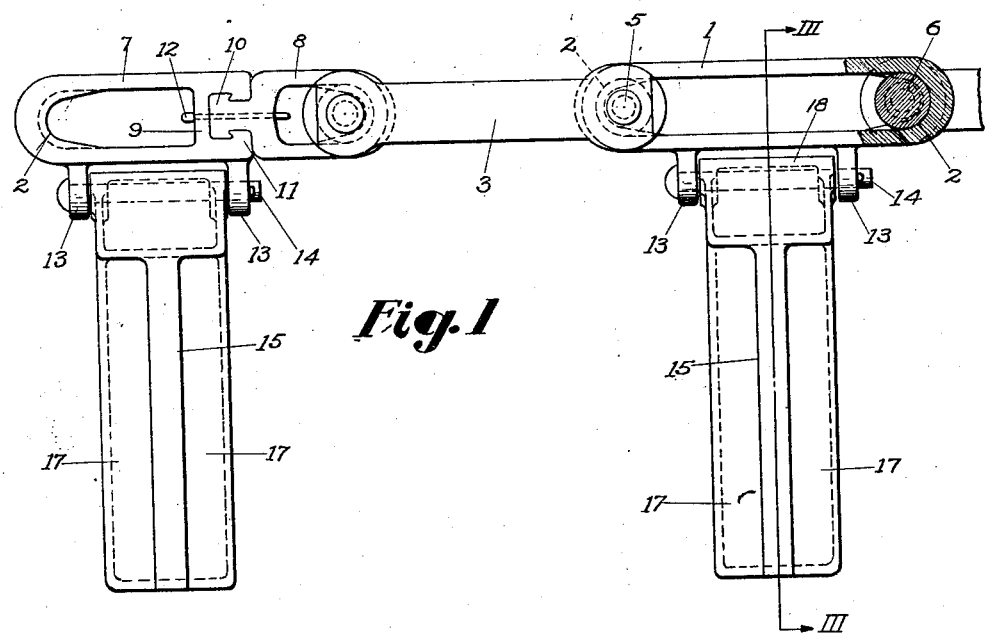
Fig. 1 is a plan view, partly in section, of a chain embodying my invention, with conveyor elements attached.

In my copending application, Serial No. 721,871, filed June 23, 1924, which has since matured into Patent No. 1,686,566, of which this present application is a division, under official requirement, I have shown my improved chain comprising a series of alternate strap and bar links which are so articulated as to permit universal flexure of the chain within limits sufficient to take care of the usual conditions under which it is used.

The strap links consist of flattened endless loops 1, preferably formed of metallic bar stock of substantially rectangular cross-section, but, if desired, they may be formed of castings or drop forgings having elongated apertures extending longitudinally of the links, and at each end there is formed a bearing seat 2 of spherical curvature.

Each bar link is formed of a pair of parallel side bars 3 having, at the ends, inwardly projecting, substantially conical or bevelled bosses 4, to give the proper thickness of metal for the pintles presently to be described. The bosses 4 are pierced by suitable apertures, into which pintles 5 are secured in any suitable manner, being here shown as riveted. Between the bosses 4, the pintles 5 are provided with the bodies 6 having curved or spherical surfaces which engage the bearing seats 2 of the adjacent link, and these parts are of such proportions as to permit universal relative angular movement of adjacent links.

Figure 2:
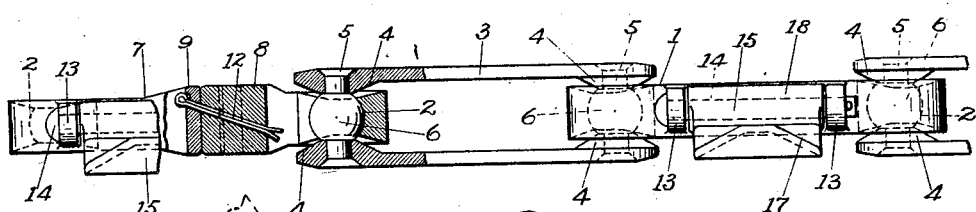
Fig. 2 is a side elevation partly in section, of the chain illustrated in Fig. 1, showing in end elevation, the conveyor elements.
Figure 3:
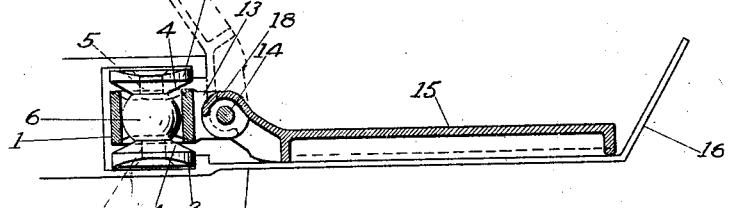
Fig. 3 is a section taken along the line III—III of Fig. 1 showing the chain, and, in section, the conveyor elements, these parts being shown in their relation to the conveyor trough.

The spherical or curved portions 6 of the pintles 5, which are engaged by the seats 2 of links 1, permit universal movement of the links relative to one another. It will be seen that the cone-like portions 4 at the ends of links 3, which give the requisite strength for supporting the pintles 5, are opposed by complementary recesses formed in the side faces of the links 1, so that a sufficient clearance is provided to permit rocking of the links relative to each other upon the spherical end bearings. Reference to Figs. 2 and 3 of the drawings shows that the conical portions 4 and the opposed complementary recesses are not in contact, but merely give clearance for free link movement in $n$ directions.

To connect the ends of the chain together, I have provided a coupling link 7 which is formed of the parts 8 and 9, each having an end bearing seat 2, similar to the seats formed in the links 1, adapted to engage the pintle 6 of the adjacent bar link. Formed on the end of the part 8 is one member of an interlocking connection, here shown as a transversely extending dovetail projection 10 adapted to engage an interlocking member on the part 9, here shown as a socket 11.

These parts are so shaped that they may be engaged or disengaged by lateral movement of the dovetail 10 relative to the socket 11, and a cotter pin 12, inserted in aligned apertures of the parts 9 and 10 when said parts are in engaged position, prevents their accidental disengagement. These aligned apertures are preferably positioned substantially in the longitudinal central plane of the link 7 and are so disposed that the cotter pin 12 will lie entirely within the bounding planes of the link 7, and thereby be protected from accidental contact with external objects while, at the same time, it is easily accessible for insertion or removal during coupling or uncoupling of the parts of the link 7. Owing to the open construction of the coupling link 7 both ends of the cotter pin 12 are easily accessible thus facilitating its insertion and removal, and the spreading of its split ends to secure it in operative position. I have shown the cotter pin 12 in the present illustration and its receiving apertures in the link sections, as disposed at an angle to the horizonal, this bringing the eye of the cotter pin and one end of the aperture near one side of the link, where it is readily accessible for removal or insertion, while the split end of the cotter pin is near the other side of the link where it may be readily spread or collapsed.

It will be observed that this connecting link is of such construction as to effectively take care of not only the usual longitudinal strains on the chain, and no weakness can develop at this point, but also any torsional strains which may be set up, without danger of separating, and, furthermore, without any strain upon the cotter pins, or other fastening means used. At the same time, the construction is such that upon removal of the cotter pin or equivalent fastening means, the parts, by relative lateral, movement, may be very readily separated. The connection between the parts 8 and 9 is so arranged that a conveyor flight, such as is hereinafter described, may be attached to one of the members of link 7, and the coupling may be readily connected or disconnected without difficulty and without disturbing the flights.

It is to be understood, however, that the parts above described may be subject to wide variation in structure without departing from the spirit of my invention.

The strap links 1 are provided, as here shown, with two laterally projecting lugs 13, a pivot pin 14 being removably mounted therein, upon which pin is mounted the laterally projecting conveyor flight 15. By this means the flights 15 are securely held against both angular and bodily movements longitudinally of the chain, but are free to swing about the pivot pins 14 in planes extending transversely thereof.

I have shown, in the drawing, a carrier flight adapted to slip beneath loose material and carry it into and along the conveyor, it being here shown in connection with a conventionally illustrated trough 16, and while other forms of conveyor flights adapted to propel material may be substituted for that here illustrated, I have found the particular flight shown to possess marked advantages with certain classes of material. The said flight 15 is formed hollow, as shown, for lightness, and an inclined portion 17, preferably, on each side of the longitudinal center of the flight, so as to be effective in either direction of movement of the chain. This gives a flight of sufficient height and of shovel-like formation to engage and carry along loose material, such as coal, without sliding idly underneath it, and yet it will pass under, without stalling or breaking, any body too heavy to be moved. In practice, masses of loose material will accumulate between the opposed incline 17 of adjacent flights and carried along en masse.

The rear or attaching end 18 of the flight 15 is preferably thrown up at an angle to meet the center line of the chain, as shown, while permitting the body of the flight to be flat upon the ground.

In order to protect the pivot bolt 14 and prevent jamming or clogging the pivotal action of the flight, the attaching end 18 is carried over or curved about the pivot member 14 (see Fig. 3) to house and protect it.

In the foregoing disclosure I have provided a coupling device adapted to quickly and conveniently connect or disconnect the adjacent ends of a chain, the particular adaptation here shown being a sprocket chain, as is adapted for use in scraper conveyors and the like. While this coupling device might be used with chains of the ordinary type, adapted to flexure in a single plane, it is particularly adapted to use in a universally flexible chain, such as is described, and in which the coupling element is subjected to torsional strains not commonly found in chains of the usual type.

Such changes as involve mechanical skill or the adoption of mechanical expedients equivalent of these herein disclosed, are to be regarded as within the purview of my invention.

What I claim is:—

1. A chain link composed of two sections, one of said sections having a head adapted to be engaged in a socket in the other of said sections by a relative lateral movement in either of two directions, and a longitudinally extending member insertable through said sections within their bounding planes for locking said sections in operative engagement.

2. A chain link composed of two sections, one of said sections having a head adapted to be engaged in a socket in the other of said sections by a relative lateral movement in either of two directions, and a longitudinally extending member insertable in aligned apertures in said sections at an angle to the base plane of the link for locking said sections in operative engagement, said member being entirely within the bounding planes of said sections.

In testimony whereof I have hereunto set my hand.

NILS D. LEVIN.